UNITED STATES PATENT OFFICE.

KARL HEINRICH WIMMER, OF HOLZHAFEN, BREMEN, GERMANY, ASSIGNOR TO HYDROGENATED OIL COMPANY, OF ST. LOUIS, MISSOURI, A CORPORATION OF NEW YORK.

CATALYZER.

1,416,249.      Specification of Letters Patent.      Patented May 16, 1922.

No Drawing.      Application filed February 13, 1913. Serial No. 748,212.

*To all whom it may concern:*

Be it known that I, KARL HEINRICH WIMMER, a citizen of Germany, residing at Holzhafen, Bremen, Germany, have invented certain new and useful Improvements Relating to Catalyzers, of which the following is a specification.

Hitherto the manufacture of catalysts, especially those consisting of finely divided metals, has presented considerable difficulties. Efforts on a small scale, heretofore made, yielded products, which had only slight catalytic properties or were liable to lose the same after a short time.

My recent experiments have proved, that it is possible to produce catalysts by mixing the starting material, such as reducible metal-compounds, with materials adapted to envelop the same, for instance with oils or other liquids, and reducing them afterwards.

The result of this treatment is, that the bodies thus obtained are in every case catalytically effective and, which is particularly important, that the catalyst, protected by the enveloping body, retains its catalytic properties. For instance 100 kilos of oil are rubbed together with 50 kilos of nickel formate or with nickel dicyandiamid, to produce an intimate mixture of finely divided nickel salt suspended in an oil vehicle, in which such nickel salt is insoluble or substantially so, the latter compound being used in either a dry condition, or as a paste, or suspended in another liquid, or as a solution. The mixture is then placed in a receptacle, which contains means for bringing it into intimate contact with gases.

Reducing gases, such as hydrogen or water gas, are then introduced, while constantly stirring the mixture and with simultaneous heating. Obviously the heating should not be sufficient to "burn" (or crack) the oil, but should be sufficient to cause reduction. The exact degree which will give best results, will depend upon the particular vehicle (i. e., oil, etc.) and upon the particular nickel salt used, as well as the specific reducing gas.

After a short time a change takes place, and the liquid becomes black owing to the formation of the catalytic substance. The treatment with the reducing gas may be continued until the metal compound has been substantially completely reduced.

The process may be carried out by using as starting materials, compounds which are soluble in the liquid serving as a protective envelope. However the formates are preferred as starting material. The catalysts thus produced may then be used in hydrogenation operations together with the total quantity of the protective material, or the major part of the latter may be removed (before such use) for example by filtration or pressure.

Nickel formate is different from most other salts of nickel, in that when it is heated to a sufficiently high temperature, it decomposes in a clean manner with the production of metallic nickel carbon dioxid and reducing gases, namely, hydrogen or carbon monoxid, or both. Hydrogen and carbon monoxid are gases of a reducing character. Such reaction occurs at temperatures below the temperature necessary to cause any extensive deleterious change in the oil. No carbon-containing liquid or solid residue is left in the oil by such operation, no tarry matters are formed. Nickel formate is accordingly to be regarded as a particularly useful substance from which to produce nickel catalyzer. Nickel formate is also an advantageous material to use because the same is easily reducible in an oil vehicle.

What I claim is:—

1. The process of manufacturing catalysts, which consists in enveloping with a protective substance, a formate of a metal which in the free state can serve as a catalyst for the hydrogenation of fatty oils, which formate is not in itself capable of serving as the catalyst for such operation, and thereafter reducing the same by heat, under reducing conditions substantially as described.

2. The process of making a catalyst which comprises enveloping in a protective vehicle, an organic compound of a metal which in the free state is capable of serving as a catalyst in hydrogenation of fatty oils, which compound itself would not readily act as a catalyst in such operation, such compound being in a dry condition, such compound also being insoluble in said vehicle, and then reducing it by heat under reducing conditions, substantially as described.

3. The method of preparing a metal catalyzer, which comprises subjecting a heated mixture of oil and nickel formate to the action of a gaseous reducing agent.

4. In the production of catalysts suitable for hydrogenation of unsaturated organic bodies, the herein described improvement which comprises heating nickel formate in a non-oxidizing vehicle which is fluid at the temperature of such operation, and while in the presence of a gaseous reducing agent.

5. In the production of catalysts suitable for hydrogenation of unsaturated organic bodies, the herein described improvement which comprises heating nickel formate while in the presence of a gaseous reducing agent.

6. In the production of catalysts suitable for hydrogenation of unsaturated organic bodies, the herein described improvement which comprises heating, while in a non-oxidizing fluid vehicle, a readily reducible nickel salt of a carbon-containing acid, such nickel salt being insoluble in such vehicle, all while in the presence of an agent capable of reducing such nickel salt.

7. A process of producing a catalyzer which comprises subjecting a mixture of an oily vehicle and a nickel salt of a carbon-containing acid, such salt being insoluble in such vehicle, and such salt further being readily reducible, to the action of heat and a gasiform fluid having reducing properties at a temperature at which reduction can be effected, and thereafter separating the precipitated nickel catalyst from the major portion of the oily vehicle.

8. A process which comprises heating under reducing conditions, a mixture of an oil and a salt of a non-noble metal which in the free state is capable of serving as a catalyst in the hydrogenation of oils, such salt being one that can be decomposed by heating to a temperature below that necessary to produce any carbonization of the oil, or to reduce tarry material therefrom, with the production of only metal and gases of a non-oxidizing character whereby an efficient catalyzer material is produced.

9. Catalyzer produced by reducing nickel formate in an oil vehicle, said catalyzer being enveloped in oil, and being free from tarry decomposition products of oil, and being in a condition of fineness readily separable from excess oil by filtration, and being of a high degree of activity.

10. A method of preparing a metal catalyst which comprises subjecting a heated mixture of oil and a formate of a non-noble metal which in the free state is capable of serving as a catalyst in the hydrogenation of oils, to the action of a gaseous reducing agent.

In testimony whereof I have hereunto set my hand in presence of two subscribing witnesses.

KARL HEINRICH WIMMER.

Witnesses:
 WILLIAM STRUP,
 LUDWIG WERGHIFFER.